(12) United States Patent
Xu

(10) Patent No.: US 11,320,628 B2
(45) Date of Patent: May 3, 2022

(54) PRISM DEVICE

(71) Applicant: SHENZHEN QIANHAI WANDONG SPORTS INTELLIGENT TECH CO., LTD., Shenzhen (CN)

(72) Inventor: Yang Xu, Shenzhen (CN)

(73) Assignee: Shenzhen Qianhai Wandong Sports Intelligent Tech Co., LTD., Guangdong (CN)

(*) Notice: Subject to any disclaimer, the term of this patent is extended or adjusted under 35 U.S.C. 154(b) by 49 days.

(21) Appl. No.: 16/887,129

(22) Filed: May 29, 2020

(65) Prior Publication Data
US 2020/0379212 A1 Dec. 3, 2020

(30) Foreign Application Priority Data

May 31, 2019 (CN) .......................... 201910479096.7

(51) Int. Cl.
*G02B 7/18* (2021.01)
(52) U.S. Cl.
CPC .................. *G02B 7/1805* (2013.01)
(58) Field of Classification Search
CPC .................................................... G02B 7/1805
USPC ......................................................... 359/831
See application file for complete search history.

(56) References Cited

U.S. PATENT DOCUMENTS

| | | | | |
|---|---|---|---|---|
| 1,454,733 A * | 5/1923 | Grissinger | ............. | G03B 31/02 359/857 |
| 1,859,682 A * | 5/1932 | Ranstead | ........... | G02B 23/2407 362/139 |
| 2,111,198 A * | 3/1938 | Stoddard | ................ | B43L 13/18 359/635 |
| 2,732,764 A * | 1/1956 | Parks | ..................... | B63B 49/00 248/480 |
| 5,570,994 A * | 11/1996 | Somekh | ............ | H01L 21/67742 414/805 |
| 6,217,180 B1 * | 4/2001 | Eisenbraum | ............ | B62B 9/005 359/871 |
| 6,220,717 B1 * | 4/2001 | Pastore | .................. | A45D 42/16 248/466 |

(Continued)

FOREIGN PATENT DOCUMENTS

| CN | 201731237 U | 2/2011 |
|---|---|---|
| CN | 205359009 U | 7/2016 |

(Continued)

*Primary Examiner* — Ricky D Shafer
(74) *Attorney, Agent, or Firm* — Rimon PC; Marc Kaufman

(57) ABSTRACT

The present disclosure relates to a prism device, comprising a prism assembly, and a holder connected to the prism assembly. The holder comprises a first end and a second end oppositely arranged, and the second end is connected to the prism assembly, the first end is used to provide a support point for the holder, and the second end is movable relative to the first end to adjust a spatial position of the prism assembly relative to the support point. It is not required to wear the prism assembly on the nose bridge by mean of using a holder to support the prism device, which reduces the weight on the wearer's nose bridge and relieve the discomfort caused by wearing objects. In addition, when the visual field changes with the movement of the head, it will not cause dizziness to the user.

2 Claims, 4 Drawing Sheets

(56) References Cited

U.S. PATENT DOCUMENTS

| | | | | |
|---|---|---|---|---|
| 6,499,851 B1* | 12/2002 | Kelly | ............... | B60R 1/003 |
| | | | | 248/480 |
| 6,923,463 B1* | 8/2005 | Ford | ............... | B60D 1/36 |
| | | | | 248/479 |
| 7,651,229 B1* | 1/2010 | Rimback | ............... | A45D 42/10 |
| | | | | 359/840 |
| 8,506,099 B1* | 8/2013 | Abdool | ............... | G02B 7/182 |
| | | | | 359/872 |
| 9,316,837 B2* | 4/2016 | Harris | ............... | A47B 23/007 |
| 2006/0158759 A1* | 7/2006 | Jasmin | ............... | G02B 27/028 |
| | | | | 359/880 |
| 2015/0301339 A1 | 10/2015 | Harris | | |

FOREIGN PATENT DOCUMENTS

| | | |
|---|---|---|
| CN | 106213805 A | 12/2016 |
| CN | 206386644 U | 8/2017 |
| CN | 207802071 U | 8/2018 |
| CN | 110376703 A | 10/2019 |
| CN | 210119622 U | 2/2020 |

\* cited by examiner

PRISM DEVICE

CROSS REFERENCE TO RELATED APPLICATIONS

This application claims priority to Chinese Patent Application No. 201910479096.7 with the title of "A Prism Device", filed on May 31, 2019, the entire contents of which are incorporated herein by reference.

TECHNICAL FIELD

The application relates to the technical field of living apparatus, in particular to a prism device.

BACKGROUND

At present, wearable glasses on sale change optical paths of vision field of the user through a TIR (Total Internal Reflection) prism with mirror coating. The user wearing the glasses can view the content perpendicular to a visual direction, thus the wearer can view TV, books or mobile phones in a looking up posture or head-up posture.

However, current mirror coating TIR prisms are all wearable devices, and the vision of the user will change with the movement of the head during use, which results in a sense of dizziness.

SUMMARY

Therefore, the technical problem to be solved by the present application is how to provide a mirror coating TIR prism (mirror-prism) device to overcome the problem in the prior art that when a user wears a prism, the vision field of the user changes with the movement of the head, which can easily cause a sense of dizziness to the user.

To solve the above technical problems, present application provides the following technical solutions:

According to an aspect of the present application, the present application provides a prism device, comprising a prism assembly, and a holder connected to the prism assembly, wherein, the holder comprises a first end and a second end oppositely arranged, and the second end of the holder is connected to the prism assembly, the first end of the holder is used to provide a support point for the holder, and the second end of the holder is movable relative to the first end of the holder to adjust a spatial position of the prism assembly relative to the support point.

Optionally, the holder comprises a rod body, having an adjustable height; an angle adjustment structure, connected between the rod body and the prism assembly, and having at least one end rotatably connected to the rod body and/or the prism assembly to adjust a relative angle between the prism assembly and the rod body.

Optionally, the angle adjustment structure comprises a ball link rod, having one end movably connected to the rod body, and the other end with a link rod ball embedded in the prism assembly; wherein, the prism assembly is rotatably connected to the link rod ball with self-damping around a spherical surface of the link rod ball.

Optionally, the rod body comprises at least two link rods connected in sequence, and the two link rods adjacent arranged are connected by a mechanical shaft with self-damping, a spatial position of the prism assembly relative to the support point is adapted for being coarsely adjusted by rotating one of the link rods around the mechanical shaft arranged between the two link rods.

Optionally, the rod body further comprises a parallel four-link rod support assembly having one end connected to the link rod, and the other end directly connected or indirectly connected through the angle adjustment structure to the prism assembly; and the spatial position of the prism assembly relative to the support point can be accurately adjusted by adjusting the parallel four-link rod support assembly.

Optionally, the angle adjustment structure comprises a rotary rod, rotatably connected to an upper end of the rod body, and a first locking member, for locking the rotary rod to the rod body; and the prism assembly is slidably mounted on the rotary rod along an axis direction of the rotary rod.

Optionally, the prism assembly comprises a mirror coating TIR (Total Internal Reflection) prism body, provided with a first magnet thereon; a connecting member, connected to the rotary rod, and provided with a second magnet that magnetically cooperates with the first magnet.

Optionally, the rod body comprises at least two hollow support rods, sleeved in sequence and a second locking member, for locking two adjacent hollow support rods.

Optionally, the rod body has a telescopic structure.

Optionally, the holder is made of a bendable plastic bend tube, and the prism assembly is rotatable relative to the plastic bend tube to adjust a pitch (orientation) angle of the prism assembly relative to the holder.

Optionally, the prism assembly comprises a mirror coating TIR (Total Internal Reflection) prism body, and a clamp, rotatably connected to the second end of the holder and comprising two clamping arms, oppositely disposed and elastically connected, and an elastic member, connected between the two clamping arms, for driving the two clamping arms to cooperate to clamp the prism body.

Optionally, the holder is made of a bendable metallic hose having a first end and second end, and the second end is rotatable around an axis of the metallic hose when the first end is fixed; and the prism assembly is fixedly connected to the metallic hose.

Optionally, the prism body and prism assembly of the present application also comprises a mirror coating.

The technical solution of the present application has the following advantages:
1. In the prism device provided by the present application, a holder is used to support the prism device and when a user views through the prism assembly, it is not required to wear the prism assembly on the nose bridge, which reduces the weight on the wearer's nose bridge and relieve the discomfort caused by wearing objects. In addition, when the visual field changes with the movement of the head, it will not cause dizziness to the user. Furthermore, the user can leave the visual field on the table at any time, maintaining the ability of quickly sensing and reacting to the surrounding environment.
2. During the process of using the prism assembly of the prism device provided by the present application, a first end of the holder is fixed on the table or directly supported on the ground to provide a support point for the holder, and then a spatial position of the second end of the holder relative to the first end of the holder is adjusted. The distance and height of the prism assembly relative to the user can be adjusted, so that the prism assembly can be better aligned with a direction of visual field of the human eyes, which results in better practicability. Moreover, the user can watch the content perpendicular to the visual direction through the prism assembly without bending the back spine and neck spine, which reduces pressure on the back spine and neck spine, and contributes to correct the sitting posture or lying posture of human body when the user watches the content perpendicular to the visual angle.

3. The prism device provided by the present application adopts an angle adjustment mechanism to adjust a pitch (orientation) angle of the prism assembly in a vertical direction and a skew angle of the prism assembly in a horizontal direction relative to the rod body, which contributes to align the prism assembly to a direction of the human eye visual field, and further improves the practicality of the prism device.

4. In the prism device provided by the present application, the angle adjustment mechanism is formed of a ball link rod with a self-damping rotation connection and a prism assembly, so that an angle of the prism assembly relative to the user can be arbitrarily adjusted.

BRIEF DESCRIPTION OF THE DRAWINGS

In order to illustrate the detailed description of the present disclosure or the technical solutions in the prior art more clearly, the drawings used in the detailed description or the description of the prior art will be briefly described below. Obviously, the drawings in the following description are used to illustrate some embodiments of the present disclosure, and those skilled in the art can obtain other drawings based on these drawings without paying any inventive labor.

REFERENCE LABEL 1, prism assembly; 11, mirror coating TIR (Total Internal Reflection) prism body; 12, first magnet; 13, connecting member; 14, second magnet; 15, clamp; 151, clamping arm; 152, elastic member; 2, holder 21, rod body; 211, link rod; 212, hollow support rod (telescopic); 213, second locking member; 22, angle adjustment structure; 221, ball link rod; 222, link rod ball; 223, rotary rod; 224, first locking member; 23. parallel four-link rod support assembly; 24. rotating connecting seat; 25. top seat; 26. plastic bend tube; 3. table; 4. support seat; 5. object to be viewed.

DETAILED DESCRIPTION

The technical solutions of the present application will be described clearly and completely below with reference to the drawings. Obviously, the described embodiments are part of the embodiments of the present application, but not all of the embodiments. Based on the embodiments of the present application, all other embodiments obtained by a person of ordinary skill in the art without making creative efforts fall within the protection scope of the present application.

It should be noted that, in the description of the present disclosure, orientation or position relationships indicated by terms such as "center", "above", "beneath", "left", "right", "vertical", "horizontal", "inside" and "outside" are based on figure illustrations, and are merely intended to facilitate and simplify description of the present disclosure, rather than indicating or implying that the device or element concerned must be specifically oriented or constructed or operated in a specific manner, and thus shall not be construed as limitations on the present disclosure. In addition, terms such as "first", "second", "third" are intended for the purpose of description, and shall not be interpreted to indicate or imply relative importance.

In the description of the present disclosure, it should be noted that, unless specified and defined otherwise, the terms of "installation", "interconnection" and "connection" shall be understood in a broad sense, for example, a fixed connection, a removable connection, an integral connection, a mechanical connection, an electrical connection, a direct connection, an indirect connection via intermediate medium, or further, internal communication between two elements, a wireless connection, or a wired connection. Case-by-case interpretation can be made to the above terms in the present disclosure by one with ordinary skill in the art.

Furthermore, technical features involved in the described different implementations of the present disclosure can be combined with each other in the case of no contradictions.

Figure 1:
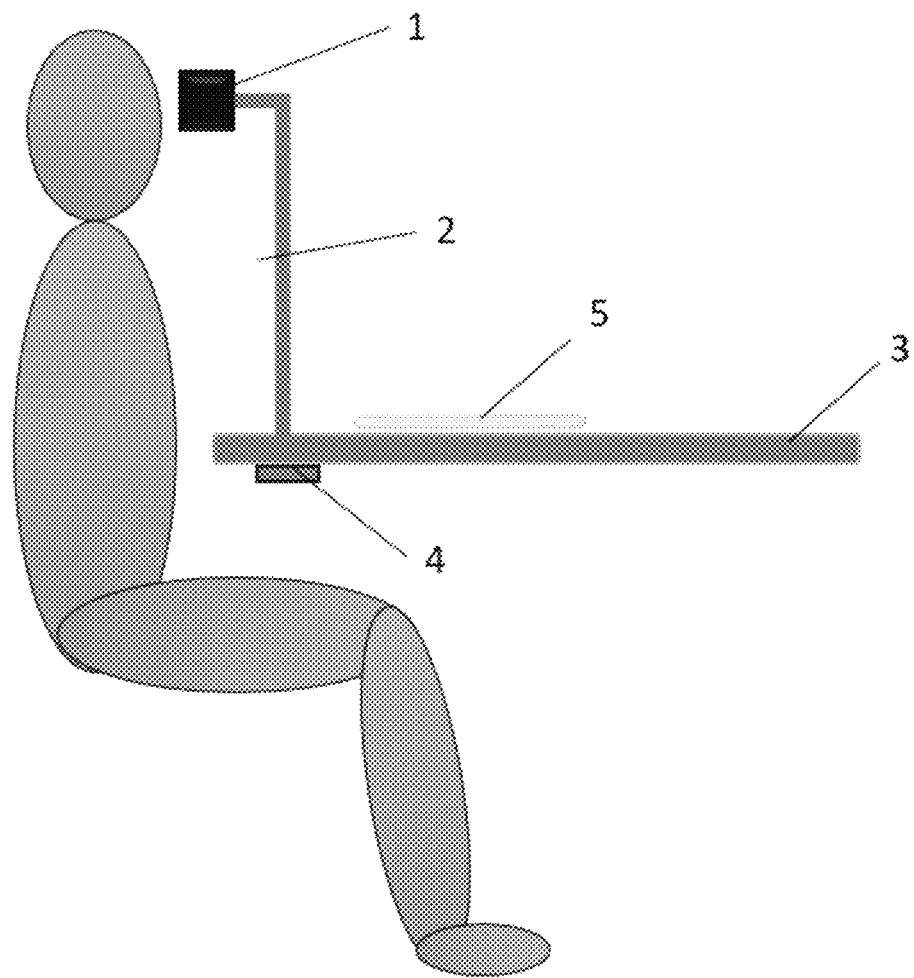
FIG. 1 is a schematic view of the use state of the prism device of the present application.

As shown in FIG. 1, a prism device comprises a prism assembly 1 and a holder 2 connected with each other. One end of the holder 2 passes through a table 3 to be fixed thereon via a support seat 4. In other embodiments, the holder 2 can also be directly supported on the ground by the support seat 4 or clamped and fixed on the edge of the table. By fixing the prism assembly 1 on the holder 2, the user can view the object 5 on the table 3 in a direction perpendicular to the visual angle via the prism assembly 1. Compared with the wearable prism in the prior art, it is not required to wear the prism assembly on the nose bridge, which reduces the weight on the wearer's nose bridge and relieve the discomfort caused by wearing objects. In addition, when the visual field changes with the movement of the head, it will not cause dizziness to the user. Furthermore, the user can leave the visual field on the table at any time, maintaining the ability of quickly sensing and reacting to the surrounding environment.

Figure 2:
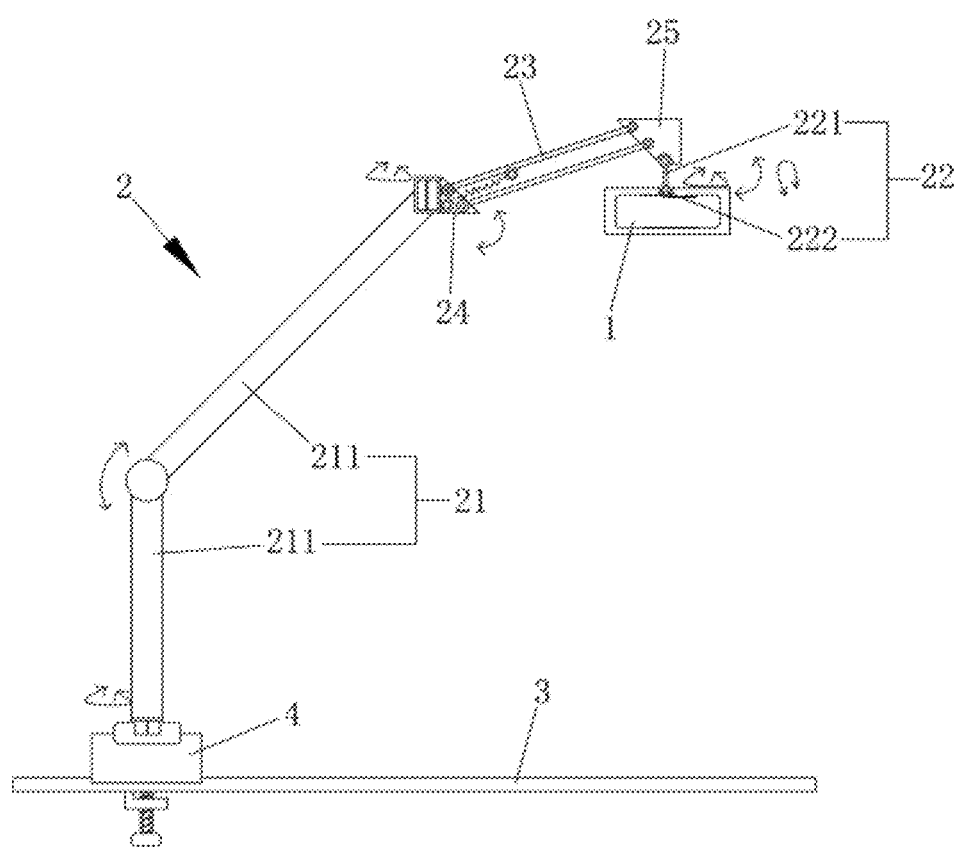
FIG. 2 is a schematic structural view of an installation structure of a prism device installed on the table in an embodiment of the present application.

Specifically, as shown in FIG. 2, in a first embodiment, the holder 2 has a first end and a second end oppositely arranged, and a first end of the holder 2 is fixed to the table 3 through the support seat 4, the support seat 4 provides a support point for the holder 2 on the table 3, and the second end of the holder 2 is connected to the prism assembly 1, and the second end of the holder 2 is movable relative to the first end of the holder 2 to adjust a spatial position of the prism assembly 1 relative to the support point.

During using the prism assembly 1, the first end of the holder 2 is firstly fixed on the table 3, and then a spatial position of the second end of the holder 2 relative to the first end of the holder 2 is adjusted to adjust the distance and height of the prism assembly 1 relative to the user, so that the prism assembly 1 can be better aligned with the direction of the human eye visual field, and becomes more practical. Moreover, the user can view the content perpendicular to the direction of the visual angle without bending the back spine and neck spine via the prism assembly 1, which reduces pressure on the back spine and neck spine, and contributes to correct the sitting posture or lying posture of human body when the user watches the content perpendicular to the visual angle.

In the first embodiment, the holder 2 comprises rod body 21 having an adjustable height, a parallel four-link rod support assembly 23, and an angle adjustment structure 22. One end of the rod body 21 is connected to a support seat 4, the parallel four-link rod support assembly 23 is connected to the end of the rod body 21 away from the support seat 4, the angle adjustment structure 22 is connected between the parallel four-link rod support assembly 23 and the prism assembly 1, and at least one end is rotatably connected between the parallel four-link rod support assembly 23 and the prism assembly 1. In other embodiments, the parallel four-link rod support assembly 23 is not required, and the prism assembly 1 and the rod body 21 are directly connected via the angle adjustment structure 22.

In the process of adjusting the distance and height of the prism assembly 1 relative to the user, an installation position of the rod body 21 on the table 3 and the height of the rod body 21 is firstly coarsely adjusted; and then, the spatial position of the prism assembly 1 relative to the support seat 4 is accurately adjusted through the parallel four-link rod support assembly 23, so that the prism assembly 1 can be better aligned with the direction of the human eye visual field; finally, an angle adjustment mechanism 22 is used to adjust a pitch (orientation) angle of the prism assembly in a vertical direction and a skew angle of the prism assembly in a horizontal direction relative to the rod body. This type of adjustable structure of the holder 2 greatly improves the flexibility and practicality of the prism assembly 1; and since a slight angle adjustment can be performed to the parallel four-link rod support assembly 23, it contributes to adjust the prism assembly 1 more accurately to an appropriate viewing position.

In the first embodiment, the rod body 21 comprises two link rods 211 that are rotatably connected, two link rods 211 adjacently arranged are connected by a mechanical shaft with self-damping, and a link rod 211 located at a lower end is rotatably connected on the support seat 4, a link rod 211 located at an upper end can rotate and hover arbitrarily in a three-dimensional space around a mechanical shaft between the two link rods 211. By rotating the link rod 211 located at the upper end, coarse adjustment of the spatial position of the prism assembly 1 relative to the support seat 4 can be achieved, which has the advantages of simple structure and convenient operation. In other embodiments, there are three or more of the link rods 211 connected by a mechanical shaft with self-damping, and rotation may be achieved between the two link rods 211 along a vertical axis or a horizontal axis. The link rod 21 can also adopt other telescopic adjustment manners such as a manner using a telescopic sleeve rod.

In other embodiments, the two link rods 211 can be connected in any other manners that allows the angle between the link rods to be changed while the two link rods can stay at different angles and provides stable support for the prism body. The connection manner includes, but not limited to, various damping shafts, spring structures, cylinders, hydraulic and friction sleeves, etc.

In the first embodiment, one end of the parallel four-link rod support assembly 23 is movably connected to one end of the link rod 211 away from the support seat 4 by the rotary connection seat 24, and the other end of the parallel four-link rod support assembly 23 is connected to a top seat 25, and the angle adjusting structure 22 is connected to the top seat 25. The parallel four-link support assembly 23 can also rotate around the vertical axis, thereby further improving the adjustability of the holder 2.

Specifically, the parallel four-link support assembly 23 comprises two link rods of the same length which are parallel to each other, and a telescopic mechanism connected between a link rod located at the upper end and a rotary connection seat 24, and two ends of each of the two links rods are respectively rotatably connected to the rotary connection seat 24 and the top seat 25, the telescopic mechanism provides support for the parallel four-link rod support assembly 23. Connecting lines of the four hinge points of the two link rods connected on the rotary connection seat 24 and the top seat 25 on the same plane form a parallelogram structure, viewing from a side surface of the parallel four-link rod support assembly 23. The connecting line between the two hinge points on the rotary connection seat 24 is regarded as a first side of the parallelogram structure, and the connecting line between the two hinge points on the top seat 25 is regarded as a second side of the parallelogram structure. The first side and the second side are oppositely arranged, and the two link rods are respectively regarded as the other two sides including a third and a fourth of the parallelogram structure, which are oppositely arranged.

The link rod can be rotated around the hinge point of the link rod connected to the rotary connection seat 24, and the top seat 25 can be moved relative to the rotary connection seat 24 through the parallelogram structure, thereby adjusting the orientation of the top seat 25 relative to the rotary connection seat 24, and compared with the adjustment method that two link rods 211 rotates around a self-damping connecting shaft to adjust the position of the top seat 25, this type of adjustment is beneficial to adjust the orientation more accurately. At the same time, the telescopic mechanism can provide support for the parallelogram structure so that the top seat 25 can hover at any position. Two link rods 211 with self-damping mechanical shafts and the parallel four-link rod support assembly 23 of the holder 2 can be used cooperatively to adjust the position of the prism assembly 1, so that angle adjustment of less degree can be performed and a position adjustment structure of the prism assembly 1 has higher degree of accuracy, therefore, the prism assembly 1 can be more accurately aligned with the direction of the human eye field, and the user can see more clearly.

Specifically, the telescopic mechanism can adopt a spring assembly, one end of the spring assembly is installed on the rotary connection seat 24, and the other end is installed on one of the link rods. When the parallel four-link rod support assembly 23 rotates at different angles, rotation angles of the spring assembly are different at the different angles, and the elastic force value also changes accordingly. The parallel four-link rod support assembly 23 can be in a force balance state at any angle, and the top seat 25 can hover at any position relative to the rotatory connection seat 24. Furthermore, the spring assembly may be a gas spring assembly or a compression spring assembly. In other embodiments, the telescopic mechanism can also be replaced by a linear push rod.

In the first embodiment, the angle adjustment structure 22 comprises a ball link rod 221, one end of the ball link rod 221 is movably connected to the top seat 25, and the other end of the ball link rod 221 is provided with a link rod ball 222 embedded in the prism assembly 1. The prism assembly 1 is connected to the link rod ball 222 around the ball surface of the link rod ball 222 in the form of self-damping rotation, and this type of connection allows to adjust angle of the prism assembly 1 relative to the ball link rod 221 arbitrarily and provides high degree of adjustability. In other embodiments, a self-damping rotation connection can also be applied in the end of the ball link rod 221 connected to the top seat 25.

Figure 3:
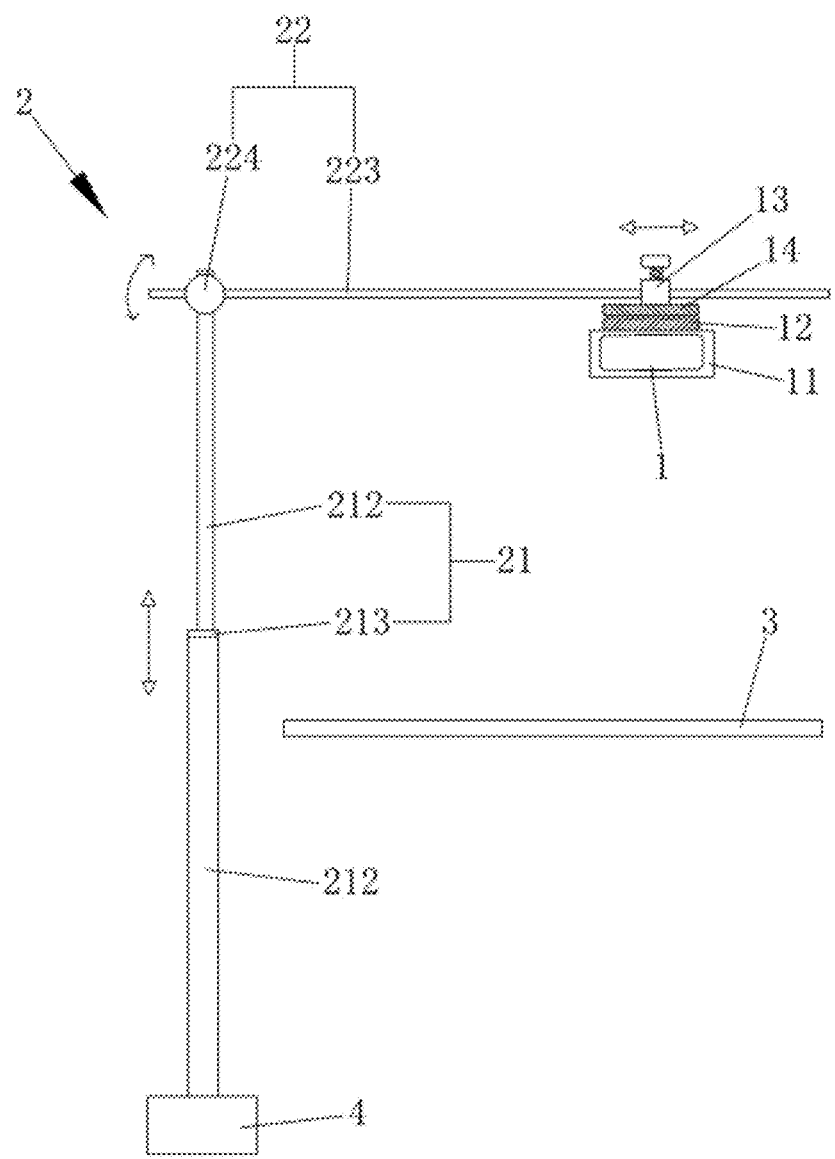
FIG. 3 is a schematic structural view of an installation structure of a prism device installed on the ground in an embodiment of the present application.

As shown in FIG. 3 of a second embodiment, the second embodiment is different from the first embodiment in that the rod body 21 is directly supported on the ground by the support seat 4, and the rod body 21 comprises two hollow support rods 212 sleeved in sequence (telescopic structure) and the second locking member 213 for locking two hollow support rods 212 adjacently arranged. The second locking member 213 can be a locking ring, a ring clamp or a locking screw. In other embodiments, there can be three or more hollow support rods 212; a hollow support rod 212 connected to the support seat 4 may be fixed on the support seat 4 or may be rotatably connected on the support seat 4.

The angle adjusting structure 22 comprises a rotary rod 223 that is rotatably connected to an upper end of the hollow support rod 212, and a first locking member 224 for locking the rotary rod 223 to the rod body 21.

A locking screw that is threaded with the hollow support rod 212 can be used in the first locking member 224. The pitch (orientation) angle of the rotary rod 223 and the prism assembly 1 relative to the table 3 in a vertical direction and a skew angle of the rotary rod 223 and the prism assembly 1 relative to the table 3 in a horizontal direction can be adjusted by the following steps: loosening the first locking member 224, rotating the rotary rod 223 and driving the prism assembly 1 to rotate, and then locking the rotary rod 223 on the hollow support rod 212 with the first locking member 224.

Specifically, the prism assembly 1 comprises a prism body 11 and a connecting member 13 slidably disposed on the rotary rod 223. A first magnet 12 is fixed on an upper end of the prism body 11, and a second magnet 14 is fixed on un lower end of the connecting member 13. The prism body 11 is fixed on the connecting member 13 through magnetic attraction of the second magnet 14 and the first magnet 12. The connecting member 13 is also movably connected with a third locking member for locking the connecting member 13 on the rotary rod 223. Specifically, the third locking member can be a locking screw. In other embodiments, the prism assembly 1 can also be connected to the holder 2 by mechanical snap fixation, adhesive fixation, and the like. One end of the holder 2 connected to the prism assembly 1 can be wholly or partially embedded in the prism assembly 1 or clamp the prism assembly 1, and the prism assembly 1 can also be partially or wholly embedded in one end of the holder 2.

Figure 4:
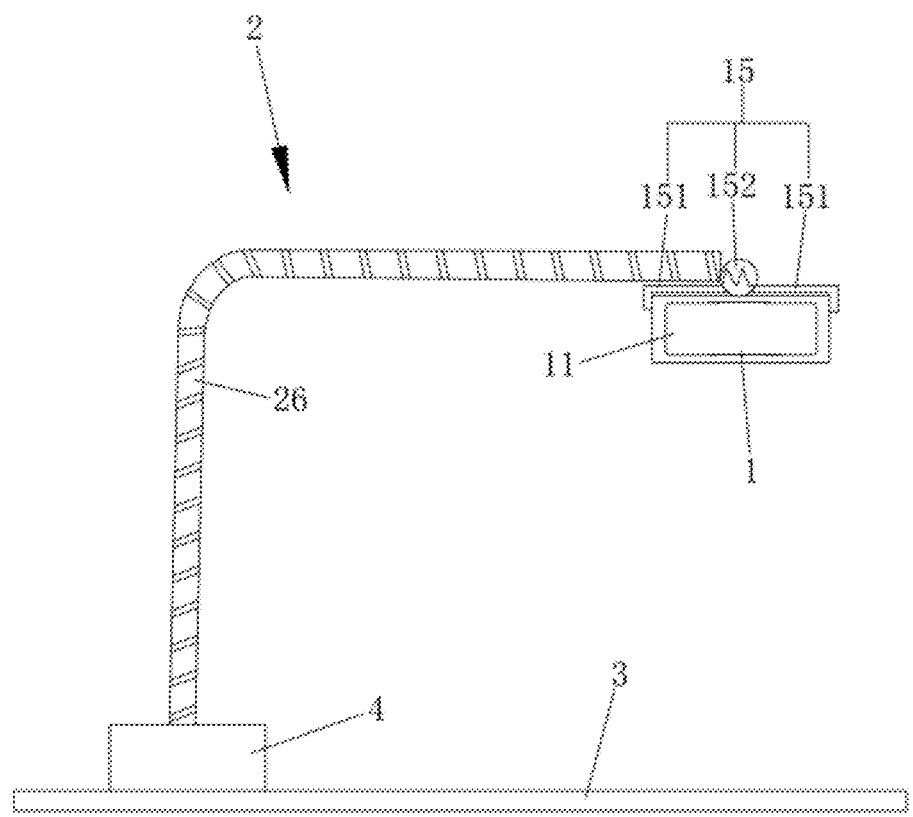
FIG. 4 is a schematic structural view of an installation structure of a prism device installed on a table in an of the present application.

As shown in FIG. 4 of a third embodiment, the third embodiment differ from the first embodiment in that the holder 2 is made of a bendable plastic bend tube 26, and the plastic bend tube 26 is a gooseneck tube or serpentine tube. In the embodiment, one end of the plastic bend tube 26 can be connected to the table 3 through the support seat 4, the prism assembly 1 is rotatably connected to the other end of the plastic bend tube 26; the end of the plastic bend tube 26 connected to the prism assembly 1 can be rotated around the other end of the plastic bend tube 26, thereby adjusting the spatial position of the prism assembly 1 relative to the support seat 4.

In the embodiment, the prism body and prism assembly of the present application also comprises a mirror coating.

In other embodiments, the holder or the rod body can be fixed in any manner that makes the rod body stably supported, which includes, but not limited to, fixing to the ground by using weight, fixing by clamp, fixing by screw or tenon and mortise structure, fixing by negative pressure suction cup, fixing by magnetic suction, and fixing by adhesive bonding, etc.

In the embodiment, the prism assembly 1 comprises a prism body 11 and a clamp 15; the clamp 15 is rotatably connected to the second end of the plastic bend tube 26, and comprises two clamping arms 151 oppositely arranged and elastically connected, and an elastic member 152 arranged between the two clamping arms 151 and driving between the clamping arms 151 to cooperate with the elastic member 152 to clamp the prism body 11. The elastic member 152 can be formed with one or more springs.

In other embodiments, the plastic bend tube 26 can also be directly disposed on the table 3 through a counterweight fixedly connected with the plastic bend tube 26, or the plastic bend tube 26 can be combined with the retractable rod 21 to function as the holder 2 of the prism assembly 1. The prism assembly 1 can also be fixed on the holder 2 that can be a metallic hose that is not only bendable but also rotatable around the axis thereof.

The spatial position of the prism assembly 1 relative to the support point and the pitch (orientation) angle of the prism assembly 1 in a vertical direction and a skew angle of the prism assembly 1 in a horizontal direction relative to the table 3 can be simultaneously adjusted by rotating the metallic hose, which results in that the prism device of the present application has a simple structure and can be easily adjusted.

In summary, 1. In the prism device provided by the present application, a holder 2 is used to support the prism device 1. When a user views through the prism assembly 1, it is not required to wear the prism assembly on the nose bridge, which reduces the weight on the nose bridge and relieve the discomfort caused by wearing objects. In addition, when the visual field changes with the movement of the head, it will not cause dizziness to the user. Furthermore, the user can leave the visual field on the table at any time, maintaining the ability to quickly sense and react to the surrounding environment.

In addition, the holder 2 provides a high degree of adjustability, and the spatial position of the prism assembly 1 relative to the user, as well as the pitch (orientation) angle of the prism assembly 1 in a vertical direction and a skew angle of the prism assembly 1 in a horizontal direction relative to the user, so that the prism assembly can be better aligned with visual field direction of human eyes, which results in better practicability. Moreover, the user can watch contents perpendicular to the visual direction through the prism assembly without bending the back spine and neck spine, which reduces pressure thereon, and contributes to correct the sitting posture or lying posture of human body when the user watches the content perpendicular to the visual angle.

Obviously, the above embodiments are merely intended to clearly illustrate rather than limit the numerated implementations. For one with ordinary skill in the art, other different forms of modifications or changes may further be made on the basis of the aforementioned descriptions. It is unnecessary and impossible to exhaust all implementations. And modifications or changes derived herefrom obviously fall into the protection scope of the present application.

What is claimed is:
1. A prism device, comprising
a prism assembly (1), and
a holder (2) connected to the prism assembly (1),
wherein,
the holder (2) comprises a first end and a second end oppositely arranged, and the second end of the holder (2) is connected to the prism assembly (1), the first end of the holder (2) is used to provide a support point for the holder (2), and the second end of the holder (2) is movable relative to the first end of the holder (2) to adjust a spatial position of the prism assembly (1) relative to the support point;

wherein the holder (2) comprises,
a rod body (21), having an adjustable height;
an angle adjustment structure (22), connected between the rod body (21) and the prism assembly (1), and having at least one end rotatably connected to the rod body (21) or the prism assembly (1) to adjust a relative angle between the prism assembly (1) and the rod body (21);
wherein the angle adjustment structure (22) comprises,
a ball link rod (221), having one end movably connected to the rod body (21), and the other end with a link rod ball (222) embedded in the prism assembly (1);
wherein, the prism assembly (1) is rotatably connected to the link rod ball (222) with self-damping around a spherical surface of the link rod ball (222);
wherein, the rod body (21) comprises at least two link rods (211) connected in sequence, and the two link rods (211) adjacently arranged are connected by a mechanical shaft with self-damping;
a spatial position of the prism assembly (1) relative to the support point is adapted for being coarsely adjusted by rotating one of the link rods (211) around the mechanical shaft arranged between the two link rods (211).

2. The prism device according to claim 1, wherein
the rod body (21) further comprises a parallel four-link rod support assembly (23) having one end connected to the link rod (211), and the other end directly connected or indirectly connected through the angle adjustment structure (22) to the prism assembly (1); and
the spatial position of the prism assembly (1) relative to the support point can be accurately adjusted by adjusting the parallel four-link rod support assembly (23).

* * * * *